Aug. 6, 1929. E. A. GALLISON 1,723,029
FISH HEADER
Filed Dec. 30, 1927 4 Sheets-Sheet 1

Inventor:
Ernest A. Gallison

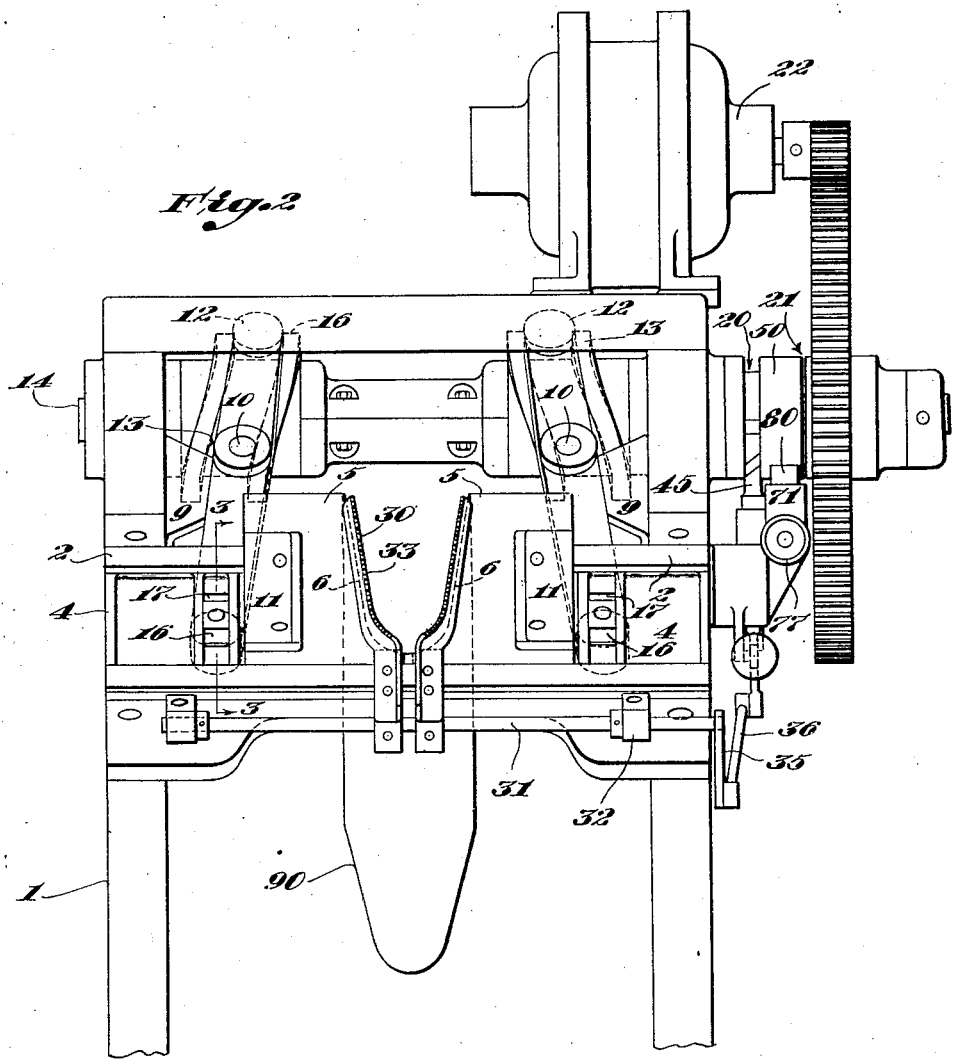

Aug. 6, 1929.  E. A. GALLISON  1,723,029
FISH HEADER
Filed Dec. 30, 1927  4 Sheets-Sheet 3
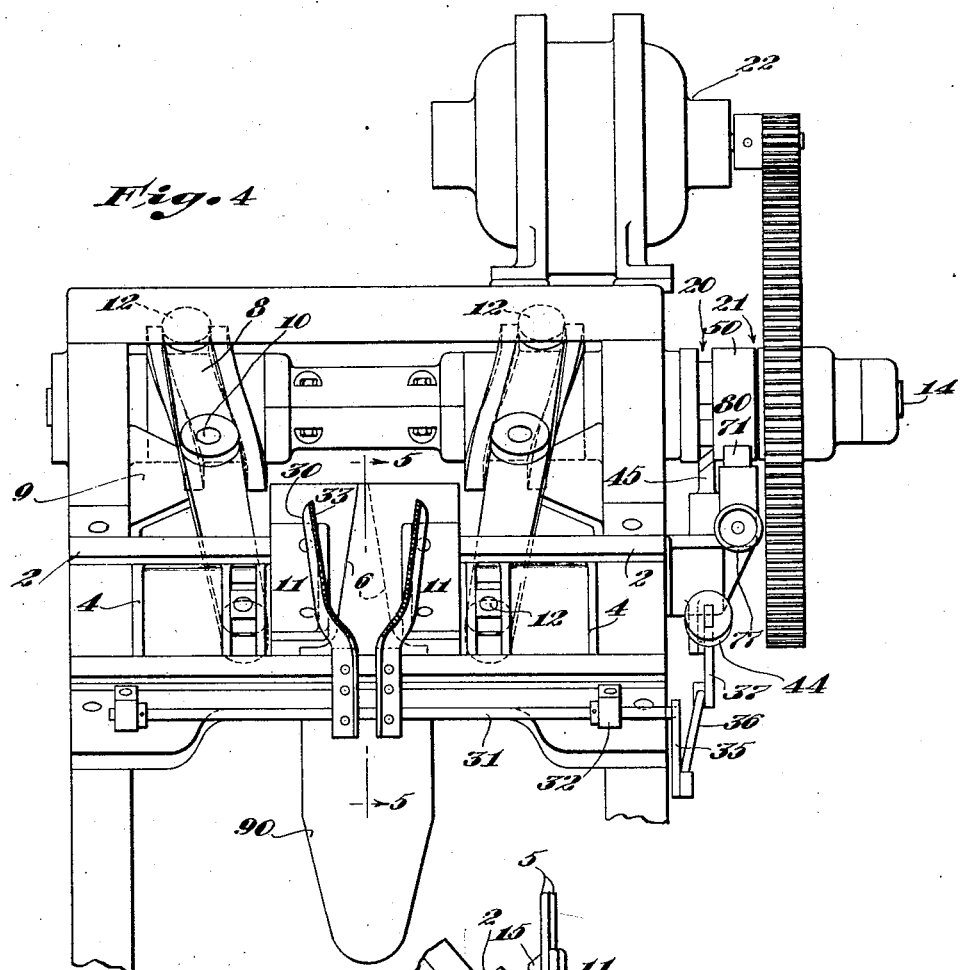
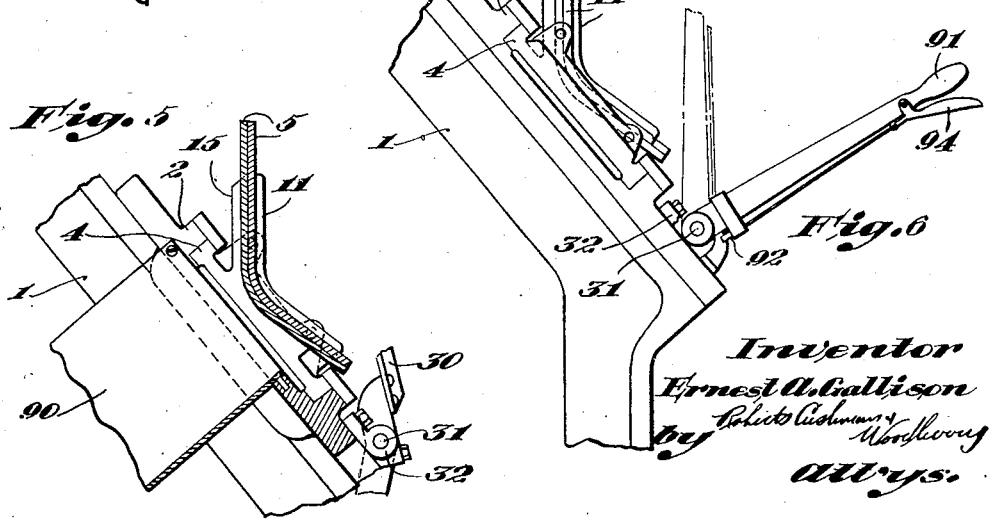

Aug. 6, 1929.  E. A. GALLISON  1,723,029
FISH HEADER
Filed Dec. 30, 1927  4 Sheets-Sheet 4
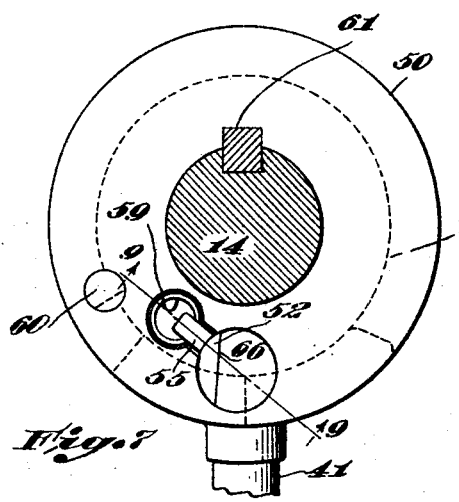
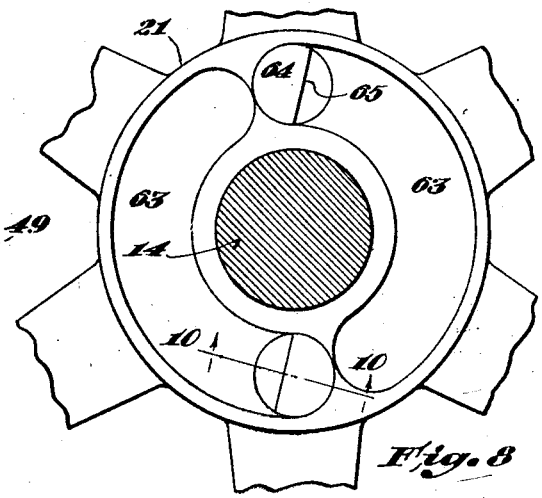
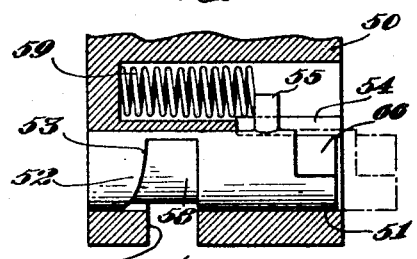
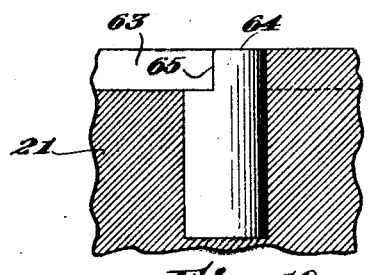
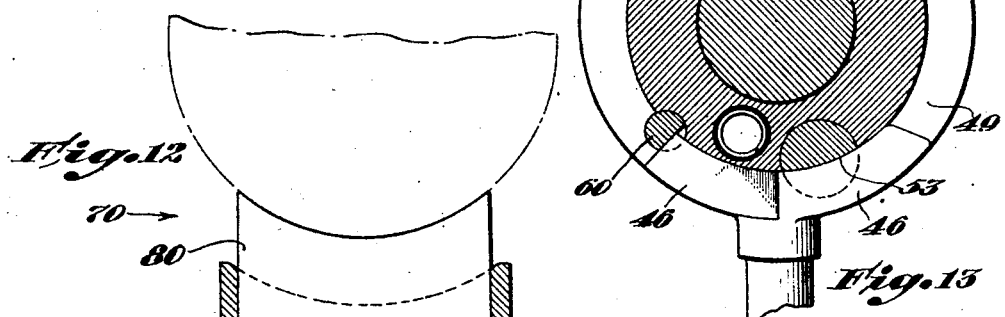
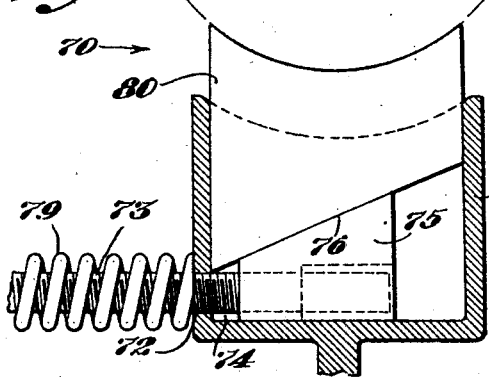
Inventor
Ernest A. Gallison
by Roberts Cushman & Woodberry
Attys.

Patented Aug. 6, 1929.

1,723,029

UNITED STATES PATENT OFFICE.

ERNEST A. GALLISON, OF WATERTOWN, MASSACHUSETTS, ASSIGNOR TO BAY STATE FISHING COMPANY, OF BOSTON, MASSACHUSETTS, A CORPORATION OF MAINE.

FISH HEADER.

Application filed December 30, 1927. Serial No. 243,596.

This invention relates to a machine especially designed to remove the heads from fish, this fish header preferably being intermittently operated in response to continuously movable driving means such as an electric motor or any other suitable source of power. Control means is provided to connect the cutting knives to the source of power each time that a head is to be removed from a fish. Preferably this control means may be automatically operable in response to the proper placing of a fish in reference to the cutting knives, although other control means having certain advantages may be substituted for the automatic means. The movement of the cutting knives is stopped as soon as a single cutting stroke has been taken while the driving means may continue to rotate.

The cutting knives are so arranged in relation to each other that they engage the fish in the most effective manner and enable the removal of the head and pectoral fins while leaving the maximum amount of flesh which is adaptable to commercial use. To this end the cutting edges of the knives are inclined toward each other so that the fish is cut with a shearing action, while the knives are curved in order to remove the fins and yet to leave fillet portions of the largest practical size.

The above and further advantageous features of the invention will be apparent to those skilled in the art upon a reading of the subjoined description and claims in conjunction with the accompanying drawings in which—

Fig. 2 is a front elevation of the same;

Fig. 3 is a section on line 3—3 of Fig. 2;

Fig. 4 is a view similar to Fig. 2 but showing the cutting knives in their overlapped position;

Fig. 5 is a section on line 5—5 of Fig. 4;

Fig. 6 is an elevational detail of an optional form of control means;

Fig. 7 is an elevational detail of the driven member of the clutch and a portion of the control mechanism therefor;

Fig. 8 is a similar view of the other member of the clutch mechanism;

Fig. 9 is a section on line 9—9 of Fig. 7;

Fig. 10 is a section on line 10—10 of Fig. 8;

Fig. 11 is a top view of a control wedge for the clutch;

Fig. 12 is a view partly in section and partly in elevation of the braking means for the driven member of the clutch;

Fig. 13 is a view partly in section and partly in elevation through a portion of the driven member of the clutch showing related parts.

Figure 1:
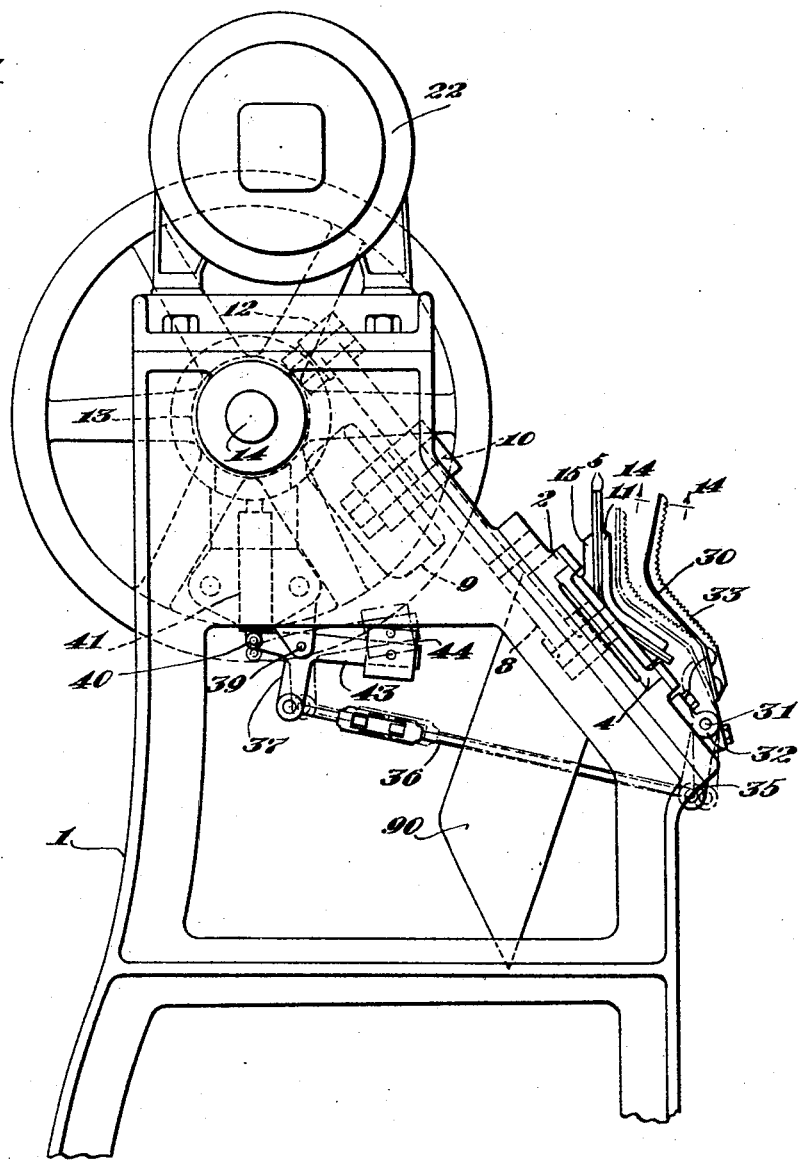
Fig. 1 is a side elevational view of the machine.
Figure 14:
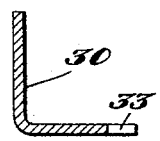
Fig. 14 is a section on line 14—14 of Fig. 1.

A machine of the character exemplified in the accompanying drawings preferably comprises a frame 1 of any form suitable to support the various component elements of the machine. Mounted upon the front portion of frame 1 are the track elements 2 which are supported in an inclined plane and are adapted to receive the knife supports 4 slidably mounted thereon. Clamping plates 11 secure each knife 5 to a suitably shaped portion 15 of its support (Fig. 5). Each knife 5 has an inclined cutting edge 6 and preferably is concave toward the front of the machine, the upper portion of the knife preferably diverging from the plane of the track elements or, in other words, extending in a substantially vertical direction, while the lower portion of the knife may lie substantially parallel to those elements or diverge slightly therefrom toward the horizontal direction, a shown in Fig. 5.

The driving linkage for the knives preferably comprises a pair of swinging arms 8, the intermediate portions of which are pivotally mounted (as designated by numeral 10) upon brackets 9 secured to the frame of the machine. The lower ends of these arms are pivoted to blocks 16 that slide in the transverse grooves 17 of supports 4. The upper end of each arm 8 is provided with a suitable boss 12 which is engageable in a guideway 13 upon a rotatable shaft 14; preferably each guideway 13 comprises a spiral cam groove which is defined by a pair of spiral ridges 16. It is thus evident that rotation of the shaft 14 serves to swing the arms 8 from the position shown in Fig. 2 wherein the knives are held in their retracted position to the position disclosed in Fig. 4 wherein the knives are in overlapping relation to each other.

The shaft 14 is preferably driven through clutch mechanism designated in general by numeral 20. The driving member 21 of this clutch may receive its movement from any suitable source such as the electric motor 22 that preferably is wound to rotate at a substantially constant speed. The clutch mechanism 20 is controlled by catch elements 30 which preferably are provided with a concave form substantially corresponding to that of the knives 5, while they taper outwardly from each other as viewed from the front of the machine. The elements 30 may preferably be of substantially angle shape, as viewed in cross section (Fig. 13); the corrugated or pronged portions 33 are located upon a portion of the angle which lies in a plane substantially perpendicular to the plane of the knives. The lower ends of catch elements 30 are secured to the oscillatable shaft 31 which is mounted in the hangers 32.

A crank 35 may be secured to the end of shaft 31 and is connected to an adjustable link 36, the opposite end of which is in turn pivotally secured to a bell crank 37. The intermediate portion of the bell crank is pivotally mounted on a fixed portion of the machine, as designated by numeral 39, and its opposite end is connected to a vertically movable control member 41, as designated by numeral 40. The bell crank 37 is also provided with an arm 43 opposite the pivot 40 which carries a suitable weight 44 normally urging the bell crank downwardly toward its full line position of Fig. 1 and tending to push the control member 41 upwardly.

The upper portion of control member 41 is connected to the arcuate wedge 45, Figs. 7, 11 and 13. As viewed in side elevation, this wedge is shaped to fit within a groove 49 in the driven member 50 of the clutch 20. The end of the member 45 is tapered substantially to a point, as designated by numeral 46. A pin 52 is slidably mounted in a transverse opening 51 in the driven member 50 and has a recess 58 in the neighborhood of the groove 49. The wall of this recess which is farthest from the driving member 21 of the clutch is preferably provided with a cam-like contour 53, as indicated in Fig. 9. The pin 52 is provided with a lug 55 which slides in a transverse slot 54 and engages a coil spring 59 that is located in a recess parallel to recess 51 whereby the pin 52 is normally urged toward the driving member of the clutch, i. e. toward its dotted line position as shown in Fig. 9. The groove 49 is preferably interrupted at one point by a transverse pin 60 which is adapted to engage the end of the arcuate wedge 45 for purposes which will presently be described.

It is evident that the driven member 50 of the clutch is keyed to the shaft 14, as designated by numeral 61, and that the pin 52 is adapted to project outwardly to engage a suitable portion of driving member 21 to permit the operative engagement of the clutch members. The portion of member 21 which adjoins driven member 50 is provided with a pair of arcuate grooves 63 at the ends of which are located pins 64 each of which has a flattened side 65 facing a groove 63. The pin 52 is similarly cut away to provide a flat surface 66 which is adapted to engage the corresponding surface 65 of a pin 64 to permit driving engagement of the clutch members.

In order to limit the continued movement of the driven member 50 of the clutch after the parts have been disengaged, I provide braking means, designated in general by numeral 70. As shown in Fig. 12, a suitable box-like member 71 is mounted upon the frame 1 and has an opening 72 through which the horizontal rod 73 extends. The inner end of this rod is preferably threaded, as designated by numeral 74, and is received in the block 75 which has an inclined upper surface 76. The outer end of rod 73 is secured to a suitable hand wheel 77 which is adapted to affect the adjustment of the shaft in relation to block 75. Between the hand wheel and the outer wall of box member 71 and mounted upon the rod 73 is located a compression coil spring 79 whereby the block 75 tends to be drawn toward the hand wheel. Located above the block 75 is a brake shoe 80 of material having a comparatively high coefficient of friction, for example lignum-vitæ. Member 80 has a lower surface inclined at an angle which is complemental to the angle of inclination of surface 76 and has an upper curved surface which engages a parallel portion of driven member 50 of the clutch 20. It is thus evident that the block 75 rests upon the bottom of box member 71 and constantly tends to move toward the left as viewed in Fig. 12, thus engaging the inclined surface of shoe 80 with a cam-like action to press the shoe into frictional engagement with the periphery of the clutch member, whereby the momentum of the parts driven by the clutch member is quickly overcome and the knives and related parts stop almost immediately upon disengagement of the clutch. However, if for any reason the brake fails entirely to stop these parts, the pin 61 engages the wedge 46 to provide a positive stop.

A suitable chute 90 at the rear of knives 5 inclines downwardly and is adapted to receive the fish body after the head is cut off.

In the operation of a machine of this character is will be understood that the workman stands in front of the machine and takes fish from any suitable point, such as a table, basket, chute or the like. The workman preferably grasps the head of the fish in the region of the eyes and introduces the tail of the fish between the fin-engaging elements 30 and the cutting edges of knives 5 so that it overhangs the chute 90. The pectoral fins of the fish project outwardly and engage the pronged portions of the elements 30, the workman pushing the fish forward with suitable pressure to swing these members to the position indicated in dotted lines in Fig. 1, whereby the control mechanism is actuated to remove the arcuate wedge 45 from groove 49. Thereupon the spring 59 will push the pin 52 outwardly so that it will project into one of the grooves 63 so that surfaces 65 and 66 will engage each other and the driving and driven members of the clutch be locked in engagement. The weight 44 aids in this movement and permits the use of a lighter pressure upon the elements 30. When the clutch elements are thus engaged the knives are moved into their overlapping position, Fig. 4, in response to the movement of the arms 8 which are controlled by the guide elements 13. The severed head remains in the hand of the operator and may be dropped into any suitable container for disposal.

It is obvious that only an instantaneous pressure upon the fin-engaging elements 30 is required to cause the engagement of the clutch members. The arcuate wedge 45 which is urged upwardly by the weight 44 will then return to its position in engagement in the groove 49 and continued rotation of the driven member will bring the pin 52 into the region of wedge 46. The cam surface 53 upon the pin being engaged by the tapered portion 46 of member 44, the pin 52 is drawn to its retracted position whereby the clutch members are disengaged; this will occur substantially at the end of one revolution so that the mechanism will stop when the knives are suitably retracted. The brake shoe 80 assists in limiting the continued movement of the mechanism while the pin 61 lying in the path of member 45 when it engages the annular groove 49 serves as a positive stop so that each movement of shaft 14 is limited to substantially one revolution during the ordinary operation of the machine.

Fig. 6 discloses a modified form of control means which may be found more advantageous for the use of the machine under certain conditions. With this form of control means the fin-engaging elements 30 are dispensed with, and a control lever 91 is secured to the end of the shaft 31, being provided with a detent element 92 whereby it may be normally locked in a position wherein the clutch is disengaged. Disengagement of the detent control 94 and pressure upon the handle will serve to move the latter to its dotted line position, as shown in Fig. 6, thereby serving to oscillate shaft 31 and to draw the wedge 46 from its position in engagement with the pin 52 to permit re-engagement of the clutch, it being evident that the weight 44 will aid in returning the lever 91 to its inoperative position.

It is evident that a machine of this character may be controlled by semi-automatic mechanism or by any suitable manual control to ensure a single reciprocating movement of the knives whereby they are brought into overlapping position to sever the fish head and the pectoral fins from the body of the fish, the latter being delivered to any suitable point by the chute 90. The concavity of the knives permits the removal of the head and fins without the unnecessary waste of marketable flesh. The members 30 not only serve automatically to engage the fins of the fish in order to actuate the machine, but serve as an effective guard to keep the hands of the operator from approaching the knives, it being evident that if the operator accidentally extends his hand toward the knives and hits the members 30, his hand will be instinctively withdrawn from these pronged elements before the knives come into overlapping engagement.

I claim:

1. A fish header comprising a pair of opposed knives, a catch for the fins of the fish adjoining the knives, mechanism for actuating the knives, and control means causing said knives to be actuated by the mechanism when the catch is engaged by the fins.

2. A fish header comprising a pair of opposed knives, a catch for the fins of the fish adjoining the knives, said catch comprising a pair of corrugated members adjoining the knives, mechanism for actuating the knives, and control means causing said knives to be actuated by the mechanism when the catch is engaged by the fins.

3. A fish header comprising a pair of opposed knives, a catch for the fins of the fish adjoining the knives, mechanism for actuating the knives, and control means causing said knives to be actuated by the mechanism when the catch is engaged by the fins, said control means being actuated to cause the mechanism to bring the knives into cutting position once in response to each engagement of the catch with the fish fins.

4. A fish header comprising a pair of opposed knives, said knives being slidably mounted to move into overlapping engagement with a shearing movement of their edges, a catch for the fins of the fish adjoining the knives, mechanism for actuating the knives, and control means causing said knives to be actuated by the mechanism when the catch is engaged by the fins.

5. A fish header comprising a pair of opposed knives, a catch for the fins of the fish adjoining the knives, said knives being concave toward the catch, mechanism for actuating the knives, and control means causing said knives to be actuated by the mechanism when the catch is engaged by the fins.

6. A fish header comprising a pair of opposed knives, a catch for the fins of the fish adjoining the knives, said catch comprising a pair of corrugated members adjoining the knives, said members having concave faces opposite to the knives, mechanism for actuating the knives, and control means causing said knives to be actuated by the mechanism when the catch is engaged by the fins.

7. A machine of the class described comprising a pair of oppositely movable knives, swinging arms for bringing the knives into overlapping engagement and mechanism adapted to effect a single movement of the arms in each direction, said mechanism including cam elements upon a rotary shaft controlling the movement of the arms and a clutch adapted to effect rotation of the shaft.

8. A machine of the class described comprising a continuously rotatable driving part, a pair of movable knives, means whereby the knives may be actuated by the driving part, said means including a clutch adapted to be engaged during an interval sufficient for one cutting movement of each knife and adapted automatically to be disengaged at the end of said interval.

9. A machine of the class described comprising a continuously rotatable driving part, a pair of movable knives, means whereby the knives may be actuated by the driving part, said means including a clutch adapted to be engaged during an interval sufficient for one cutting movement of each knife and adapted automatically to be disengaged at the end of said interval, a rotatable shaft driven by the clutch, and linkage connecting said shaft with the knives.

10. A machine of the class described comprising a continuously rotatable driving part, a pair of movable knives, means whereby the knives may be actuated by the driving part, said means including a clutch adapted to be engaged during an interval sufficient for one cutting movement of each knife and adapted automatically to be disengaged at the end of said interval, a rotatable shaft driven by the clutch, spiral guide elements on the shaft, and swinging arms engaging the spiral elements and actuating the knives.

11. A machine of the class described comprising a continuously rotatable driving part, a pair of movable knives, means whereby the knives may be actuated by the driving part, said means including a clutch adapted to be engaged during an interval sufficient for one cutting movement of each knife, a rotatable shaft driven by the clutch, linkage connecting said shaft with the knives, and control mechanism tripped by the fins of the fish to cause engagement of the clutch.

12. A machine of the class described comprising a continuously rotatable driving part, a pair of movable knives, means whereby the knives may be actuated by the driving part, said means including a clutch adapted to be engaged during an interval sufficient for one cutting movement of each knife and adapted automatically to be disengaged at the end of said interval, a rotatable shaft driven by the clutch, a linkage connecting said shaft with the knives, and means to limit movement of the knives and connecting parts when the clutch is disengaged.

13. A machine of the class described comprising a continuously rotatable driving part, a pair of movable knives, means whereby the knives may be actuated by the driving part, said means including a clutch adapted to be engaged during an interval sufficient for one cutting movement of each knife, a rotatable shaft driven by the clutch, spiral guide elements on the shaft, swinging arms engaging the spiral elements and actuating the knives, and a brake to limit the movement of the rotatable shaft when the clutch is disengaged.

14. A machine of the class described comprising a continuously rotatable driving part, a pair of movable knives, means whereby the knives may be actuated by the driving part, said means including a clutch adapted to be engaged during an interval sufficient for one cutting movement of each knife, a rotatable shaft driven by the clutch, a linkage connecting said shaft with the knives, control mechanism tripped by the fins of the fish to cause engagement of the clutch, a brake to decelerate the movement of the shaft when the clutch is disengaged and a stop positively to limit said movement.

15. A fish header comprising a pair of opposed knives, a catch for the fins of the fish adjoining the knives, said catch comprising a pair of corrugated members adjoining the knives, said members also serving as guards for the hands of the operator of the machine, mechanism for actuating the knives, and control means causing said knives to be actuated by the mechanism when the control means is engaged by the fins.

16. A machine of the class described comprising a continuously rotatable driving part, a pair of movable knives, guide means supporting the knives to permit their sliding in opposite directions into overlapping relation, means for imparting movement from the driving part to the knives, said knives having their cutting edges curved and lying in planes intersected by the path of their sliding movement.

17. A machine of the class described comprising a continuously rotatable driving part, a pair of movable knives, means whereby the knives may be actuated by the driving part, said means including a clutch adapted to be engaged during an interval sufficient for one cutting movement of each knife and adapted automatically to be disengaged at the end of said interval, a rotatable shaft driven by the clutch, spiral guide elements on the shaft, and swinging arms engaging the spiral elements and actuating the knives.

Signed by me at Boston, Massachusetts, this 28th day of December, 1927.

ERNEST A. GALLISON.